(12) United States Patent  (10) Patent No.: US 7,915,751 B2
Su et al.  (45) Date of Patent: Mar. 29, 2011

(54) OUTPUT POWER CONTROL OF A WIND POWER GENERATOR THROUGH BENDABLE TAIL WING AND TAIL ROD

(75) Inventors: Wei-Nian Su, Taoyuan County (TW); Chin-Jen Chang, Taoyuan County (TW)

(73) Assignee: Institute of Nuclear Energy Research, Longtan, Taoyuan (TW)

( * ) Notice: Subject to any disclaimer, the term of this patent is extended or adjusted under 35 U.S.C. 154(b) by 403 days.

(21) Appl. No.: 12/132,608

(22) Filed: Jun. 3, 2008

(65) Prior Publication Data
US 2009/0295166 A1 Dec. 3, 2009

(51) Int. Cl.
*F03D 9/00* (2006.01)
(52) U.S. Cl. ...................... 290/55; 416/132 B
(58) Field of Classification Search .......... 290/55, 290/43–44, 54; 416/1, 132 B, 7; 415/7, 415/2.1, 4.2, 4.3, 4.5
See application file for complete search history.

(56) References Cited

U.S. PATENT DOCUMENTS

| 1,818,672 | A * | 8/1931 | Bucklen | 416/238 |
| 4,547,124 | A * | 10/1985 | Kliatzkin et al. | 416/86 |
| 4,832,571 | A * | 5/1989 | Carrol | 416/132 B |
| 6,616,402 | B2 * | 9/2003 | Selsam | 415/3.1 |
| 7,276,809 | B2 * | 10/2007 | Zambrano et al. | 290/55 |
| 2009/0230686 | A1 * | 9/2009 | Catlin | 290/54 |

* cited by examiner

*Primary Examiner* — Michael C Zarroli

(57) ABSTRACT

The invention is related to a wind power generator with controllable power output, which comprises an elastic tail rod and a tail wing. One end of the elastic tail rod connects with the wind power generator; the other end of the elastic tail rod connects with the tail wing. The yaw center for the wind power generator deviates from its center line. With this shifted yaw center and the elastic tail rod, the tail wing and the elastic tail rod do not deform, or deform only a little to keep the power generator in the wind direction to acquire the maximum wind energy before reaching the rated power wind speed. Furthermore, when the wind speed exceeds the rated power wind speed, the tail wing and the elastic tail rod will bend more to force the wind power generator at a certain angle with the wind direction to control the wind power generator in a constant rated power output and to protect the wind power generator as well as the turbine blades.

7 Claims, 7 Drawing Sheets

FIG3.B

OUTPUT POWER CONTROL OF A WIND POWER GENERATOR THROUGH BENDABLE TAIL WING AND TAIL ROD

BACKGROUND OF THE INVENTION

1. Field of the Invention

The invention is related to a wind power generator, especially one that can control output power.

2. Description of the Prior Art

A wind power generator uses turbine blades to convert the wind energy into the mechanical energy, and then uses the power generator to convert the mechanical energy into the electric energy output. Thus, a common practice is to maximize the energy output before reaching the rated power. The wind power generator should always face the wind in the right direction. On the other hand, if the yaw direction for the wind power generator deviates from the wind direction by a large angle, the wind energy utilization efficiency will be low. This also means that at the same wind speed the wind power generator will have a lower output power. The control of direction for the wind power generator can be divided into active mode and passive mode. The active mode uses motor to change the direction for the wind power generator, while the passive mode uses tail wing to keep wind power generator to face the wind. The invention aims at the passive mode for improvement.

The passive direction control for wind power generator is as shown in FIG. 1A. The wind power generator 10' has a rigid tail rod 12' and a tail wing 14'. The center of rotation 101' for the wind power generator 10' is located at the central line for the wind power generator. When the wind power generator 10' is facing the wind direction 2', the turbine 103' for the wind power generator 10' only produces net axial force 105' that passes the central line, so the net torque with respect to the yaw center 101' for the wind power generator 10' is zero and the wind power generator 10' keeps facing the wind direction 2'. Besides, as shown in FIG. 1B, when the wind direction 2' is changed and the wind direction 2' and the wind power generator 10' form an angle 107', the turbine 103' for the wind power generator 10' produces lateral force ($F_{Bx}$) 109' as well as axial force ($F_{By}$) 105'. The tail wing 14' for the wind power generator 10' also produces tail wing force ($F_{tail}$) 108'. At this moment, if the net torque relative to the yaw center for the wind power generator meets the following equation:

$$F_{tail}c > F_{Bx}b + M_{bearing}$$

The wind power generator 10' will return from the status in FIG. 1B to the status in FIG. 1A. The $M_{bearing}$ is the frictional torque for the bearing relative to the yaw center for the wind power generator 10'.

The above is the layout for a common wind power generator 10' that uses tail wing 14' to change direction. The yaw center 101' for a wind power generator 10' is located at the central line for the wind power generator 10'. The tail rod 12' is made of rigid material. The function of the tail wing 14' is only to control the wind power generator 10' to face the wind direction 2'. At this moment, as shown in FIG. 2A, if the yaw center 101' for the wind power generator 10' is shifted from the central line (distance a), when the wind power generator 10' is facing the wind direction 2', the turbine blades 103' for the wind power generator 10' will produce axial force ($F_{By}$) 105'. If the net moment is larger than the static friction ($M_{bearing}$) of the bearing about the yaw center 101', as shown in the following equation:

$$F_{By}a > M_{bearing}$$

The wind power generator 10' will deviate from the wind direction 2' until the forces are in balance, as shown in FIG. 2B. The net moment about the yaw center 101' for the wind power generator 10' is shown in the following equation:

$$F_{By}a + F_{Bx}b = F_{tail}c + M_{bearing}$$

Consequently, the wind power generator 10' and the wind direction 2' will form an angle 107'. As the wind speed increases, the axial force 105', the lateral force 109' as well as the tail wing force 108' will increase simultaneously. As the result, the angle 107' will remain unchanged or only increase a little bit. Therefore, if the wind power generator 10' uses combination of yaw center 101' shifting and rigid tail rod 12', the wind power generator 10' will produce an angle 107' as the wind speed exceeds a certain value. However, this angle will not increase with wind speed. To solve the above issue, the invention utilizes a bendable elastic tail rod to control the power output.

SUMMARY OF THE INVENTION

One objective for the invention is to provide a wind power generator with controllable power output. Using an elastic tail rod to connect the tail wing and the wind power generator, the elastic tail rod and the tail wing do not deform and keep the wind power generator facing the wind direction to acquire the maximum wind energy until the wind power generator reaches the rated power.

Another objective for the invention is to provide a wind power generator with controllable power output. When the wind speed exceeds the rated power wind speed, the elastic tail rod and the tail wing deform to make an angle between the wind power generator direction and the wind direction such that the wind power generator maintains the rated power output in order to protect the wind power generator and the turbine blades. With increasing wind speed, the deformation angle for the elastic tail rod increases, and the angle between the wind power generator and the wind direction also increases.

To achieve the above objectives, the invention provides a wind power generator with controllable power output. The wind power generator further comprises an elastic tail rod and a tail wing. One end of the elastic tail rod connects with the wind power generator. The other end of the elastic tail rod connects with the tail wing. The yaw center for the wind power generator deviates from the central line of the wind power generator. The material for the elastic tail rod and the tail wing is selected from glass fiber, carbon fiber, ABS and other plastics. The area for the tail wing is determined by the deformation angle produced by the elastic tail rod.

Other objectives, advantages and novel features of the invention will become more apparent from the following detailed description when taken in conjunction with the accompanying drawings.

BRIEF DESCRIPTION OF THE DRAWINGS

FIG. 3B: top view for the elastic tail rod and the tail wing for a preferred embodiment for the invention;

DETAILED DESCRIPTION OF THE PREFERRED EMBODIMENT

Figure 1A:
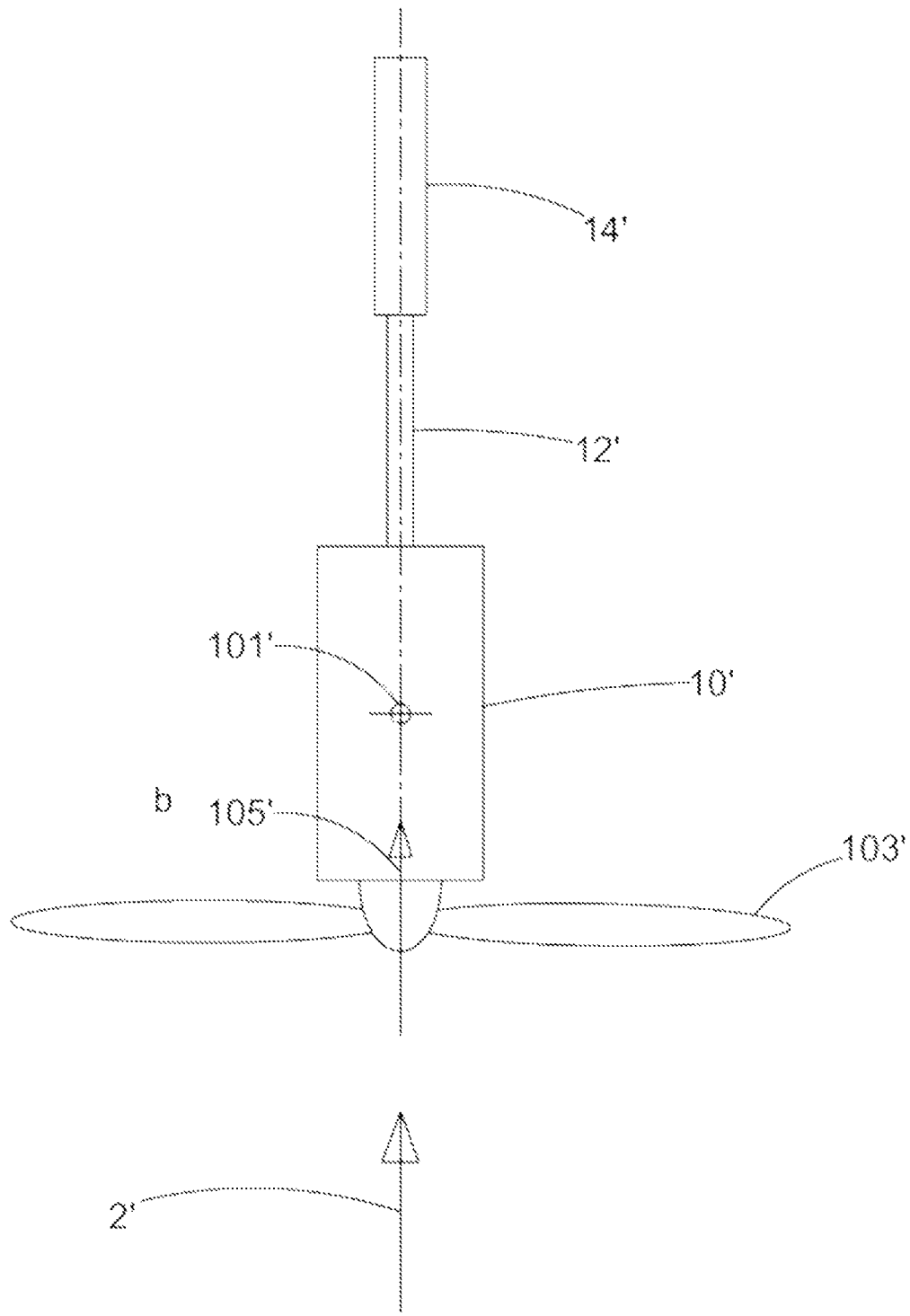
FIG. 1A: an illustration for the status of use for a traditional wind power generator.
Figure 1B:
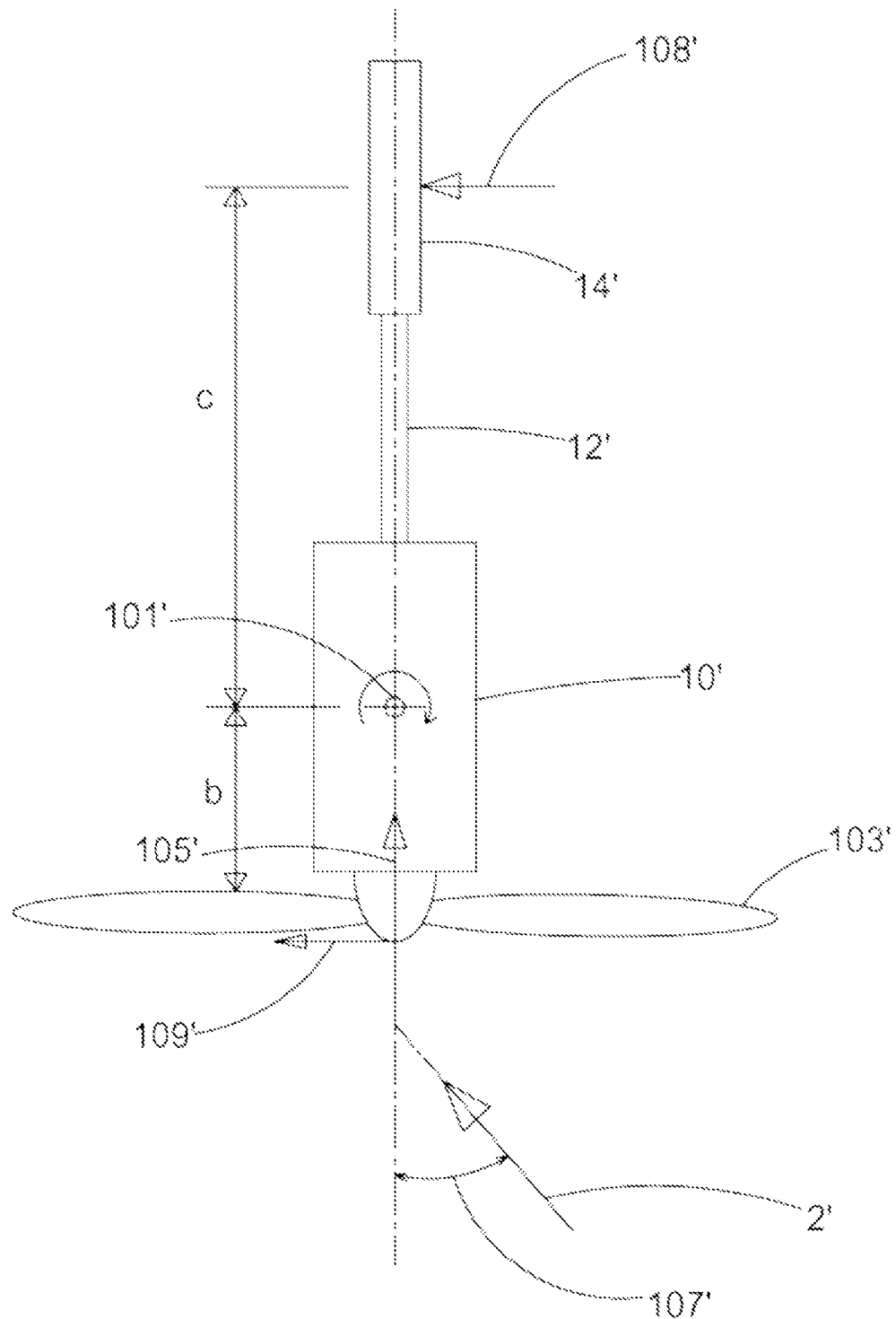
FIG. 1B: an illustration for the status of another use for a traditional wind power generator.
Figure 2A:
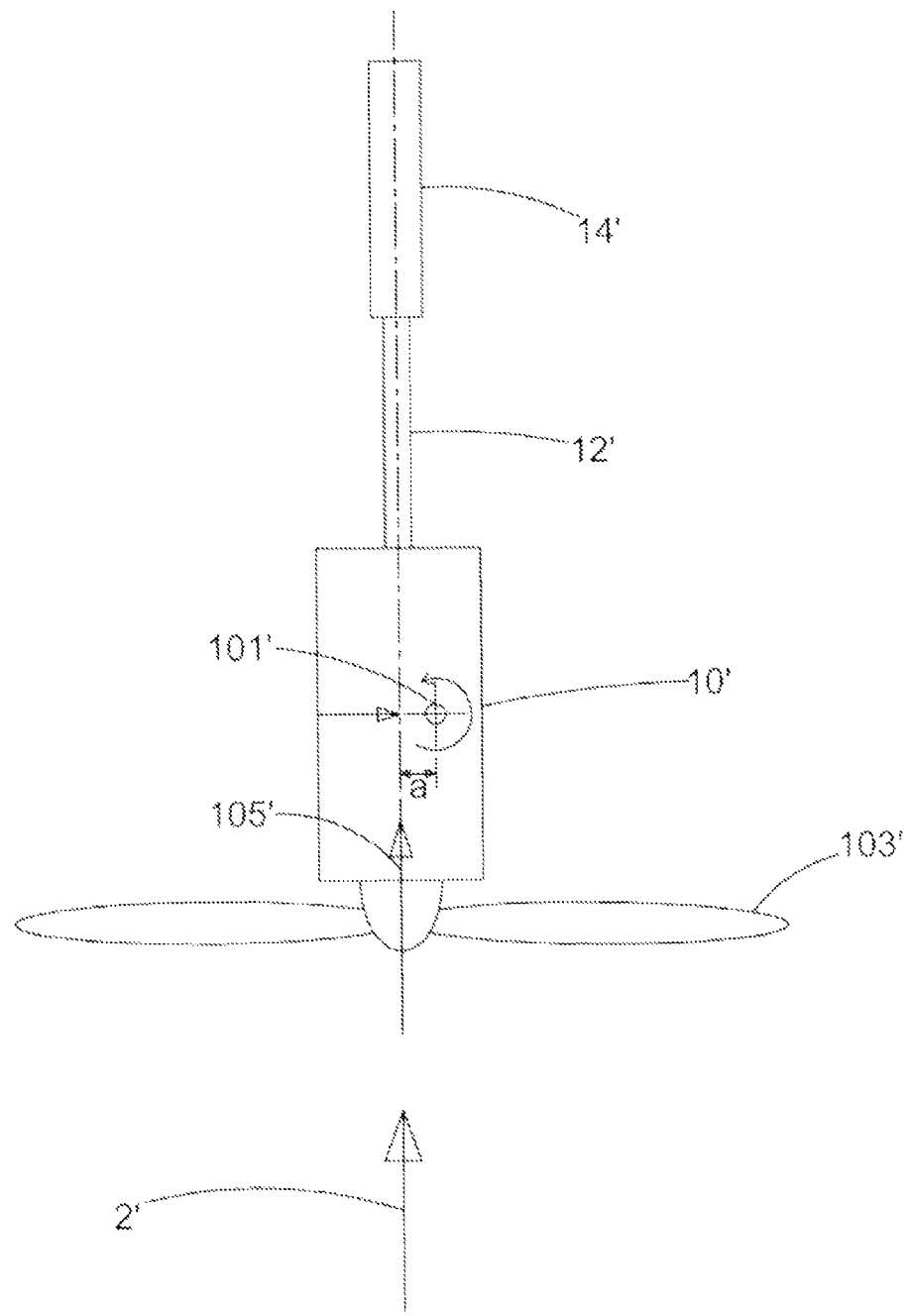
FIG. 2A: an illustration for the status of use for a traditional wind power generator.
Figure 2B:
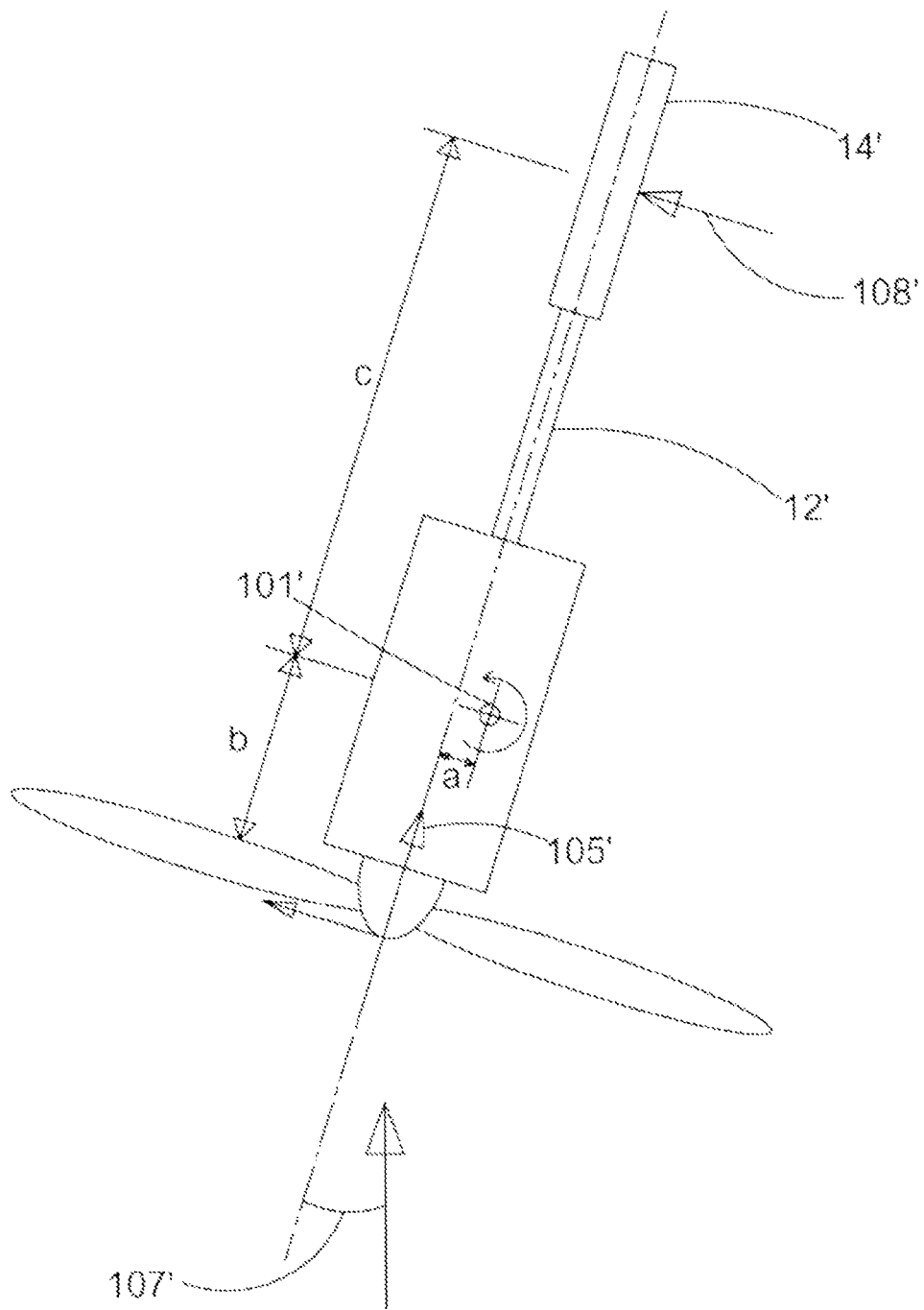
FIG. 2B: an illustration for the status of another use for a traditional wind power generator.
Figure 3A:
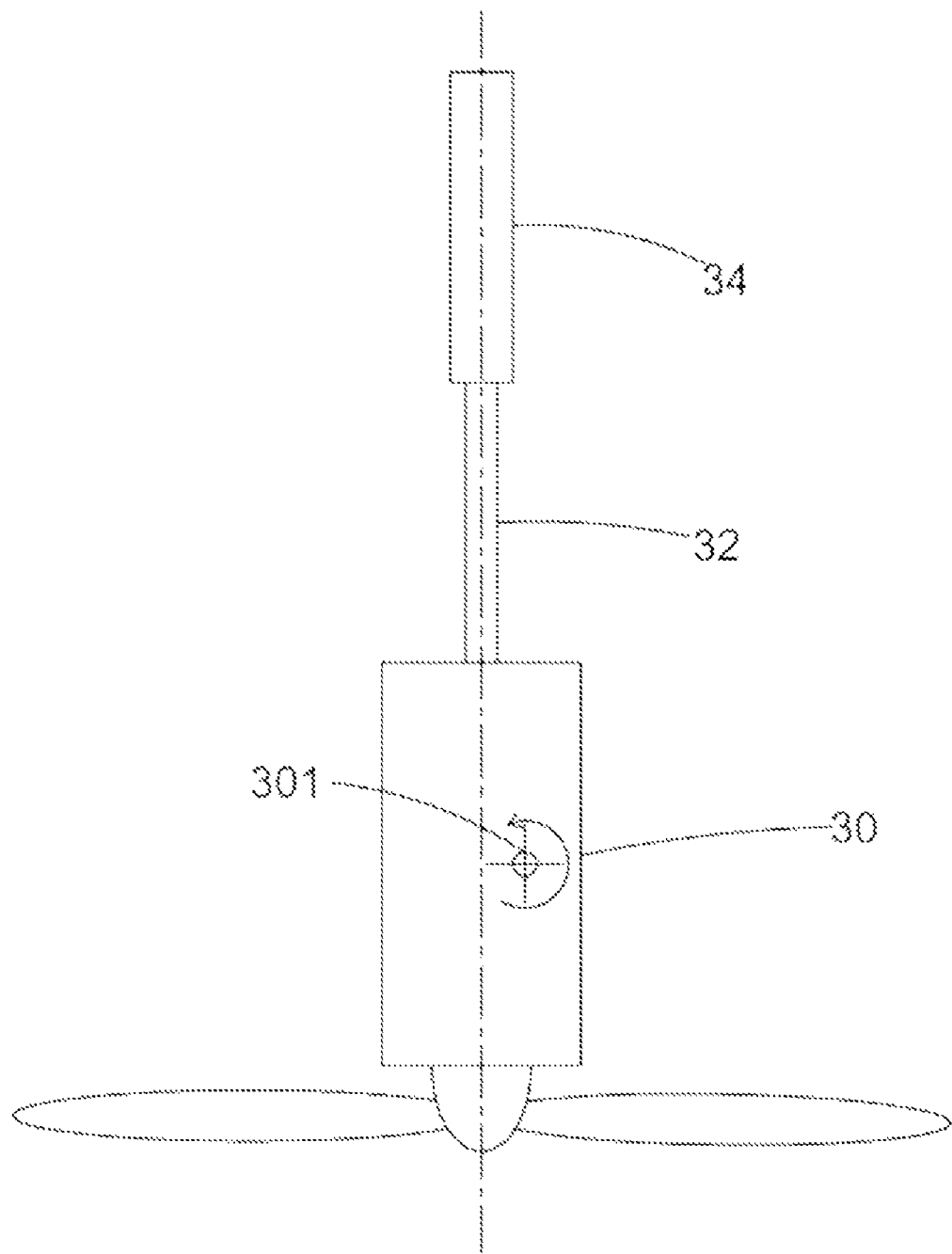
FIG. 3A: an illustration for structure for a preferred embodiment for the invention.
Figure 3C:
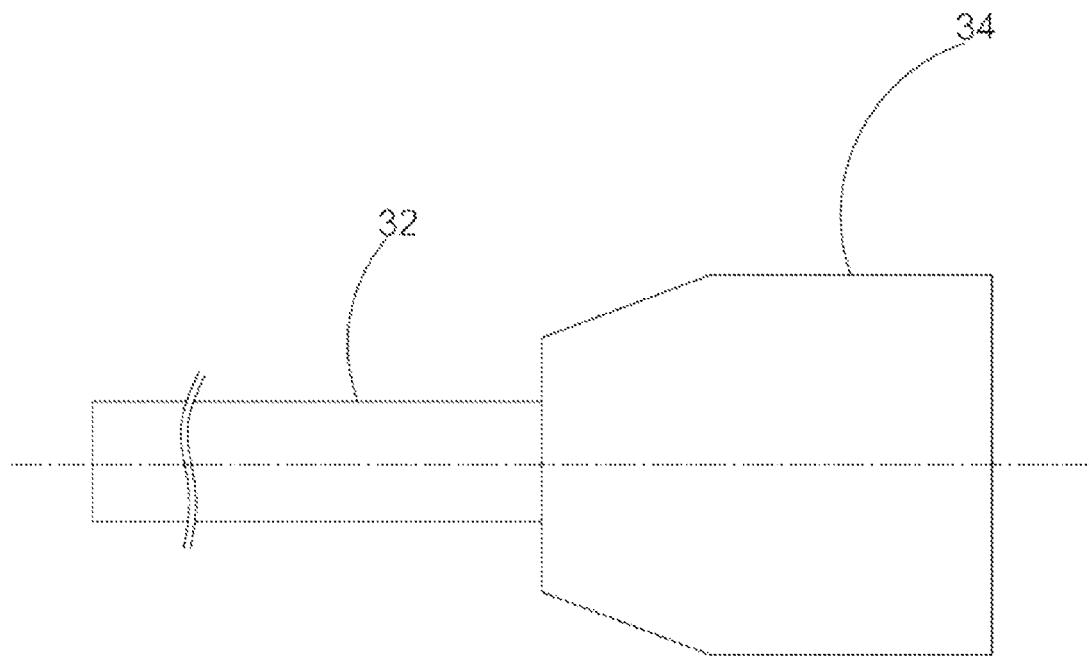
FIG. 3C: cross-sectional view for the elastic tail rod and the tail wing for a preferred embodiment for the invention.
Figure 3C:
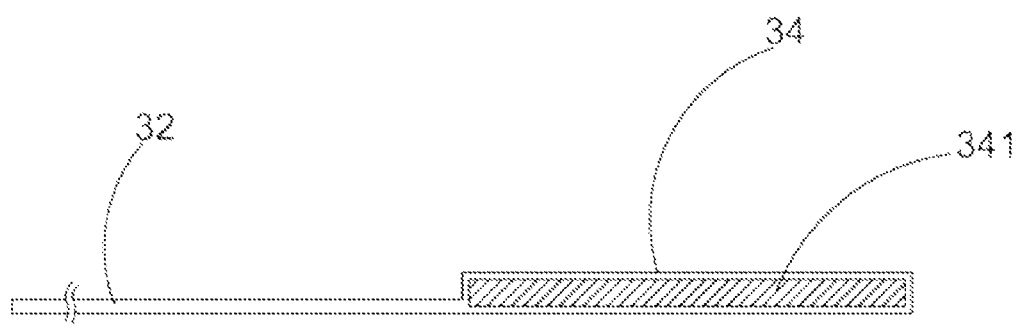

Please refer to FIG. 3A for an illustration for a preferred embodiment for the invention. As shown in the figure, the invention provides a wind power generator with controllable power output, which comprises a wind power generator 30, an elastic tail rod 32 and a tail wing 34. One end of the elastic tail rod 32 connects with the wind power generator 30. The other end of the elastic tail rod 32 connects with the tail wing. Considering deformation, strength and elastic fatigue for the materials used for the wind power generator 30, suitable materials are: glass fiber, carbon fiber, ABS or other plastics. The material for the tail wing 34 can also be glass fiber, carbon fiber, ABS or other plastics. Please refer to FIG. 3B for the top view of the elastic tail rod and the tail wing for a preferred embodiment for the invention. As shown in the figure, the elastic tail rod 32 and the tail wing 34 form one body. The central line of the elastic tail rod 32 passes the tail wing 34. The central line of the elastic tail rod 32 divides the tail wing 34 to two symmetric blocks in top and bottom. The elastic tail rod 32 can be long strip, circle or other shapes. When the cross-section for the elastic tail rod 32 is rectangular, the dimensions for the rectangle is determined by the moment of the inertia, the material Young's modulus and the length of the elastic tail rod 32. The area for the tail wing 34 is determined by the deformation angle of the elastic tail rod 32 under different wind speeds. Please refer to FIG. 3C for an illustration of the cross-section for the elastic tail rod and the tail wing for a preferred embodiment for the invention. As shown in the figure, tail wing 34 has a foam material 341 inside.

Figure 3D:
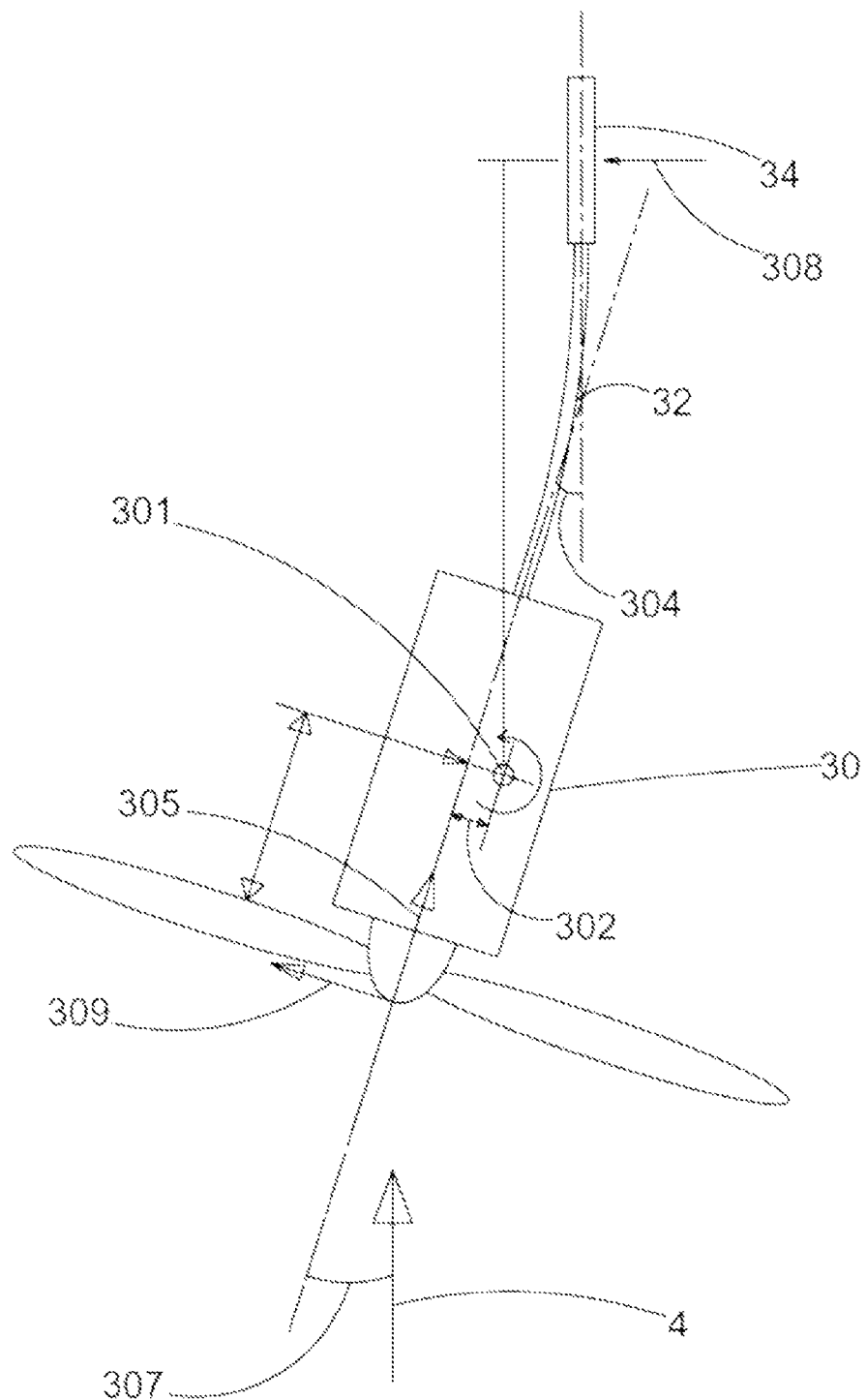
FIG. 3D: an illustration for the status of use for a preferred embodiment for the invention.

Please refer to FIG. 3D for an illustration of the status of use for a preferred embodiment for the invention. As shown in the figure, the invention provides a wind power generator with controllable power output, which uses the yaw center 301 shifting from the central line of the wind power generator 30 and the elastic tail rod 32 deforms to produce an angle 307 between the wind power generator 30 and the wind direction 4. The angle 307 increases with the wind speed and controls the power output of the wind power generator 30.

The yaw center 301 for the wind power generator 30 is at a deviation distance 302 from its central line. When the wind power generator 30 is in the wind direction 4, it uses its yaw center 301 as pivot point, so the wind makes the wind power generator 30 produce a net moment about the yaw center, which is the multiplication product of the axial force 305 for the wind power generator 30 and the deviation distance 302. When the net moment is larger than the static friction of the yaw bearing, the wind power generator 30 will rotate about the yaw center and form an angle 307 with respect to the wind direction 4. The tail wing 34 produces a tail wing force 308. With increasing wind speed, the tail wing force 308 increases. The elastic tail rod 32 produces a deformation angle 304. With increasing deformation angle 304, the angle 307 increases and the angle between the wind power generator 30 and the wind direction 4 keeps increasing until all the forces are in balance.

Please refer to Table 1 for the performance data of a preferred embodiment for a wind power generator for the invention. As shown in the table 1, the wind speed for the designed rated power, 25 kW, of the wind power generator is 9.5 m/s. The maximum allowable output power for the wind power generator is 36 kW. When the wind power generator is in the wind direction, i.e. the angle between the wind power generator and the wind direction is 0 degree, the wind power generator has the highest efficiency 35.83%; when the wind power generator and the wind direction form an 20 degree angle, the efficiency for the wind power generator drops to 29.67%. According to the above data, when the wind speed exceeds the value for rated power, such as 12 m/s, the elastic tail rod of the invention can maintain the angle between the wind power generator and the wind direction in the range of 35 degree to 45 degree. The turbine speed for the wind power generator can be maintained between 1.03 Hz and 0.94 Hz. The output power for the wind power generator can be maintained between 33.31 kW and 25.3 kW, which is also between the rated power and the maximum allowable power to protect turbine and the generator. To achieve the above objective, the angle between the wind power generator and the wind direction will need to increase with increasing wind speed due to the deformation of the elastic tail rod.

TABLE 1

| Performance data | | | | |
|---|---|---|---|---|
| Wind speed m/s | Deformation angle (degree) | Blade rotation speed (Hz) | Output power (kW) | Efficiency (%) |
| 9 | 0 | 0.919 | 23.66 | 35.83 |
| 9 | 5 | 0.915 | 23.37 | 35.39 |
| 9 | 10 | 0.904 | 22.52 | 34.11 |
| 9 | 15 | 0.886 | 21.22 | 32.14 |
| 9 | 20 | 0.863 | 19.59 | 29.67 |
| 12 | 30 | 1.073 | 37.67 | 24.07 |
| 12 | 35 | 1.030 | 33.31 | 21.28 |
| 12 | 40 | 0.985 | 29.16 | 18.63 |
| 12 | 45 | 0.939 | 25.30 | 16.16 |

The difference between the wind power generator and the traditional wind power generator is that the invention uses elastic tail rod and shifted yaw center for the wind power generator, whereas the traditional wind power generator uses rigid tail rod and its yaw center is at the central line. The function of the tail wing for the traditional wind power generator is only to keep the wind power generator in the wind direction. As the wind speed exceeds the rated power wind speed, the traditional wind power generator will not yaw out of the wind direction. Thus, if there is no other deceleration mechanism, the wind power generator will overrun to cause damage. The invention uses an elastic tail rod and shifted yaw center for the wind power generator such that it can keep the wind power generator in the wind direction before reaching the rated power wind speed. When the wind speed exceeds the value for rated power, the deformation angle for the elastic tail rod increases, and so does the angle between the wind power generator and the wind direction in order to effectively control the turbine speed for the wind power generator.

From the above, it is known that the invention provides a wind power generator with controllable power output. By using an elastic tail rod to connect the tail wing and the wind power generator, and the yaw center shifting from the central line of the wind power generator, the elastic tail rod and the tail wing do not deform and keep the wind power generator in the wind direction to acquire the maximum wind energy before reaching the rated power wind speed. When the wind speed exceeds the value for rated power, the elastic tail rod and the tail wing will deform to form an angle between the wind power generator and the wind direction in order to maintain the rated power output as well as to protect the wind power generator and the turbine blades. The deformation angle of the elastic tail rod will increase along with the increase of the wind speed. The angle between the wind power generator and the wind direction will increase as the result. The increased angle between the wind power generator and the wind direction helps to control the power output for the wind power generator.

In summary, the invention is innovative, progressive and commercializable and shall meet the requirements for our patent law. The application is thus filed for review and approval.

The above description is only the preferred embodiment for the invention and not to limit the scope for the invention. Those equivalent alteration and modification with respect to shape, structure, characteristics and principle shall be within the scope of the claims for the invention.

What is claimed is:

1. A wind power generator with controllable power output comprises:

a wind power generator having a yaw center deviating from a central line of the wind power generator;

an elastic tail rod, one end connects with the wind power generator; the other end of the elastic tail rod connects with a tail wing, wherein the elastic tail rod and the tail wing form one body, and the central line of the elastic tail rod passes the tail wing, wherein the central line of the elastic tail rod divides the tail wing into two symmetric blocks in top and bottom portions.

2. As described in claim 1 for a wind power generator with controllable power output, the material used for the elastic tail rod can be glass fiber, carbon fiber, ABS or other plastics.

3. As described in claim 1 for a wind power generator with controllable power output, the material used for the tail wing can be glass fiber, carbon fiber, ABS or other plastics.

4. As described in claim 1 for a wind power generator with controllable power output, there is foam material inside the tail wing.

5. As described in claim 1 for a wind power generator with controllable power output, the cross-section for the elastic tail rod can be rectangle, circle or other shapes.

6. As described in claim 1 for a wind power generator with controllable power output, when the cross-section for the elastic tail rod is rectangle, its dimension is determined by the moment of inertia, Young's modulus and length for the elastic tail rod.

7. As described in claim 1 for a wind power generator with controllable power output, the area for the tail wing is determined by the deformation angle for the elastic tail rod.

* * * * *